United States Patent
De Souza et al.

(10) Patent No.: US 7,617,245 B2
(45) Date of Patent: Nov. 10, 2009

(54) WORKFLOW DEFINITION AND MANAGEMENT SYSTEM

(75) Inventors: Andre Guerreiro Milhomem De Souza, Chicago, IL (US); Diogo Nunes, Sao Paulo (BR); Gustavo Prado, Sao Paulo (BR); Max Barreto, Sao Paulo (BR)

(73) Assignee: Accenture Global Services GmbH (CH)

( * ) Notice: Subject to any disclaimer, the term of this patent is extended or adjusted under 35 U.S.C. 154(b) by 278 days.

(21) Appl. No.: 11/679,097

(22) Filed: Feb. 26, 2007

(65) Prior Publication Data

US 2008/0209416 A1 Aug. 28, 2008

(51) Int. Cl.
*G06F 9/46* (2006.01)
(52) U.S. Cl. .................. 707/104.1; 707/101; 705/9; 705/8
(58) Field of Classification Search ............ 705/8–9, 705/14; 718/100; 707/101, 104.1
See application file for complete search history.

(56) References Cited

U.S. PATENT DOCUMENTS

| | | | |
|---|---|---|---|
| 6,115,640 A | 9/2000 | Tarumi | |
| 2002/0059512 A1* | 5/2002 | Desjardins | 713/1 |
| 2003/0110067 A1* | 6/2003 | Miller et al. | 705/8 |
| 2004/0059615 A1* | 3/2004 | Byrer et al. | 705/8 |
| 2005/0209903 A1* | 9/2005 | Hunter et al. | 705/9 |
| 2006/0218028 A1* | 9/2006 | Kelly et al. | 705/8 |
| 2008/0208665 A1* | 8/2008 | Bull et al. | 705/8 |

FOREIGN PATENT DOCUMENTS

EP 1598760 A1 * 11/2005

* cited by examiner

*Primary Examiner*—Tim T. Vo
*Assistant Examiner*—Shiow-Jy Fan
(74) *Attorney, Agent, or Firm*—Fish & Richardson P.C.

(57) ABSTRACT

A workflow can be managed by presenting one or more questions to a user, wherein the questions are associated with a present status of an entity being processed through a workflow; receiving input from the user corresponding to the presented questions; evaluating the received input to determine whether one or more tasks associated with the present status have been completed; determining to advance the entity to a subsequent status in the workflow if each of the tasks associated with the present status has been completed; and executing an action mapping to advance the entity. Further, it can be determined not to advance the entity to the subsequent status in the workflow if each of the one or more tasks associated with the present status has not been completed. Thus, the entity can be retained in the present status or transferred to a previous status in the workflow.

20 Claims, 7 Drawing Sheets

WORKFLOW DEFINITION AND MANAGEMENT SYSTEM

TECHNICAL FIELD

The present disclosure relates to data processing by digital computer, and to systems and methods for workflow definition and management, including directing an entity through a workflow.

BACKGROUND

The ability to manage one or more aspects of a workflow can be important to performing the workflow efficiently and successfully. A workflow can be used to describe constraints within which one or more functions are to be performed and to allocate resources for performing the one or more functions. Further, a workflow can describe tasks associated with performing a function, such as producing an item or providing a service, and can identify one or more parties permitted and/or required to execute such tasks. Additionally, a workflow can be modified to accommodate different tasks, such as in response to a previous iteration of the workflow or in response to a new requirement of the workflow. Managing one or more aspects of a workflow can include determining whether a particular task has been completed and identifying the resources expended in performing a task, such as hours worked or money spent.

In the past, individual reporting tools were used to capture information describing one or more portions of a workflow, such as adherence to a schedule or the resources expended in performing a task. For example, Gantt charts have been used to provide a schedule and to indicate a level of completeness at a particular point in time. A chart, however, can become out-dated after a short period of time. As the workflow progresses, additional information can become available and values can change. Further, updating a chart to indicate the current status of a workflow can require manual data collection and processing.

Project management applications were developed to provide functionality beyond reporting, such assisting with project planning and execution. A project management application can be configured as a desktop application utilized by a single user or as a distributed application that can be accessed by multiple users. Further, a project management application can be used to store information associated with a workflow over a period of time, thereby facilitating time-based analysis. Project management applications also can include charting tools, such as utilities that can automatically generate charts based on stored information. The information utilized by a project management application typically is entered manually by one or more application users. Simple project management applications have been implemented using spreadsheet and database programs, while specialty applications have been developed to provide more complex functionality.

Collaboration applications and workflow management tools also have been developed to provide project management applications that can make project management data available across computer networks. Web-based collaboration applications can be configured to store data in a central location, such as a network-accessible database, that can be accessed by authorized clients either automatically or on request. Additionally, collaboration applications can be configured to provide the same functionality as stand-alone project management applications, but also can perform distributed processing and data collection techniques across multiple computing devices.

SUMMARY

A workflow management system can be utilized to define and manage one or more workflows, such as a workflow to produce a product or provide a service. Further, the workflow management system can be configured to collect and store various items of information associated with an entity being processed through a workflow. Additionally, the workflow management system can receive a variety of requirements and specifications from a user, such as through an interface, and can perform one or more operations based on the received requirements and specifications. Many of these techniques and methods rely on defining a workflow in the workflow management system, such that the steps and requirements of the workflow are ordered in an executable sequence. The present inventors recognized that it was beneficial to define a workflow as a module comprised of one or more statuses, such that each status represents a step of the workflow.

The present inventors also recognized the need to associate one or more tasks with a status of the workflow to indicate requirements that need to be satisfied to complete the status. Further, the need to identify one or more parties responsible for the workflow also was recognized. Additionally, the present inventors also recognized the need to permit one or more questions to be associated with a status to help determine whether all of the required tasks associated with that status have been completed. Accordingly, the techniques and apparatus described here implement algorithms for defining and managing a workflow.

In general, in one aspect, the techniques can be implemented to include presenting one or more questions to a user, wherein the one or more questions are associated with a present status of an entity being processed through a workflow; receiving input from the user corresponding to the one or more presented questions; evaluating the received input to determine whether one or more tasks associated with the present status have been completed; determining to advance the entity to a subsequent status in the workflow if each of the one or more tasks associated with the present status has been completed; and executing an action mapping to advance the entity.

The techniques also can be implemented to include determining not to advance the entity to the subsequent status in the workflow if each of the one or more tasks associated with the present status has not been completed. Further, the techniques can be implemented such that the entity is retained in the present status. Additionally, the techniques can be implemented to include executing an action mapping to transfer the entity to a previous status in the workflow.

The techniques also can be implemented to include receiving input from the user indicating a reason for determining not to advance the entity. Further, the techniques can be implemented to include determining an amount of rework associated with determining not to advance the entity. Additionally, the techniques can be implemented such that evaluating further comprises associating the received input with at least one of the one or more presented questions and determining whether a criteria corresponding to the at least one presented question has been satisfied based on the received input.

The techniques also can be implemented such that presenting one or more questions further comprises presenting a plurality of predetermined responses to a question. Further, the techniques can be implemented to include verifying that the user belongs to a cluster associated with the workflow before evaluating the received input. Additionally, the techniques can be implemented to include associating each of the one or more questions with one or more tasks associated with the present status.

In general, in another aspect, the techniques can be implemented as a computer program product, encoded on a computer-readable medium, operable to cause data processing apparatus to perform operations comprising presenting one or more questions to a user, wherein the one or more questions are associated with a present status of an entity being processed through a workflow; receiving input from the user corresponding to the one or more presented questions; evaluating the received input to determine whether one or more tasks associated with the present status have been completed; determining to advance the entity to a subsequent status in the workflow if each of the one or more tasks associated with the present status has been completed; and executing an action mapping to advance the entity.

The techniques also can be implemented to be further operable to cause data processing apparatus to perform operations comprising determining not to advance the entity to the subsequent status in the workflow if each of the one or more tasks associated with the present status has not been completed. Further, the techniques can be implemented such that the entity is retained in the present status. Additionally, the techniques can be implemented to be further operable to cause data processing apparatus to perform operations comprising executing an action mapping to transfer the entity to a previous status in the workflow.

The techniques also can be implemented to be further operable to cause data processing apparatus to perform operations comprising receiving input from the user indicating a reason for determining not to advance the entity. Additionally, the techniques can be implemented to be further operable to cause data processing apparatus to perform operations comprising determining an amount of rework associated with determining not to advance the entity. Further, the techniques can be implemented to be further operable to cause data processing apparatus to perform operations comprising associating the received input with at least one of the one or more presented questions and determining whether a criteria corresponding to the at least one presented question has been satisfied based on the received input.

The techniques also can be implemented to be further operable to cause data processing apparatus to perform operations comprising presenting a plurality of predetermined responses to a question. Additionally, the techniques can be implemented to be further operable to cause data processing apparatus to perform operations comprising verifying that the user belongs to a cluster associated with the workflow before evaluating the received input. Further, the techniques can be implemented to be further operable to cause data processing apparatus to perform operations comprising associating each of the one or more questions with one or more tasks associated with the present status.

The techniques described in this document can be implemented to realize one or more of the following advantages. For example, the techniques can be implemented such that the workflow management system can automatically determine whether an entity can be transferred from one status to another. The techniques also can be implemented to permit the tracking of any rework associated with an entity and to indicate the reason the rework was performed. Additionally, the techniques can be implemented such that a cluster comprising one or more parties can be associated with a workflow and assigned permissions with respect to performance of the workflow. The techniques also can be implemented such that an instance of a workflow for a particular entity can be modified, including through the addition, deletion, or modification of one or more statuses. The techniques further can be implemented such that the workflow management system can be accessed through a web interface.

The details of one or more implementations are set forth in the accompanying drawings and the description below. Other features and advantages will be apparent from the description and drawings, and from the claims.

BRIEF DESCRIPTION OF THE DRAWINGS

Like reference symbols indicate like elements throughout the specification and drawings.

DETAILED DESCRIPTION

Figure 1:
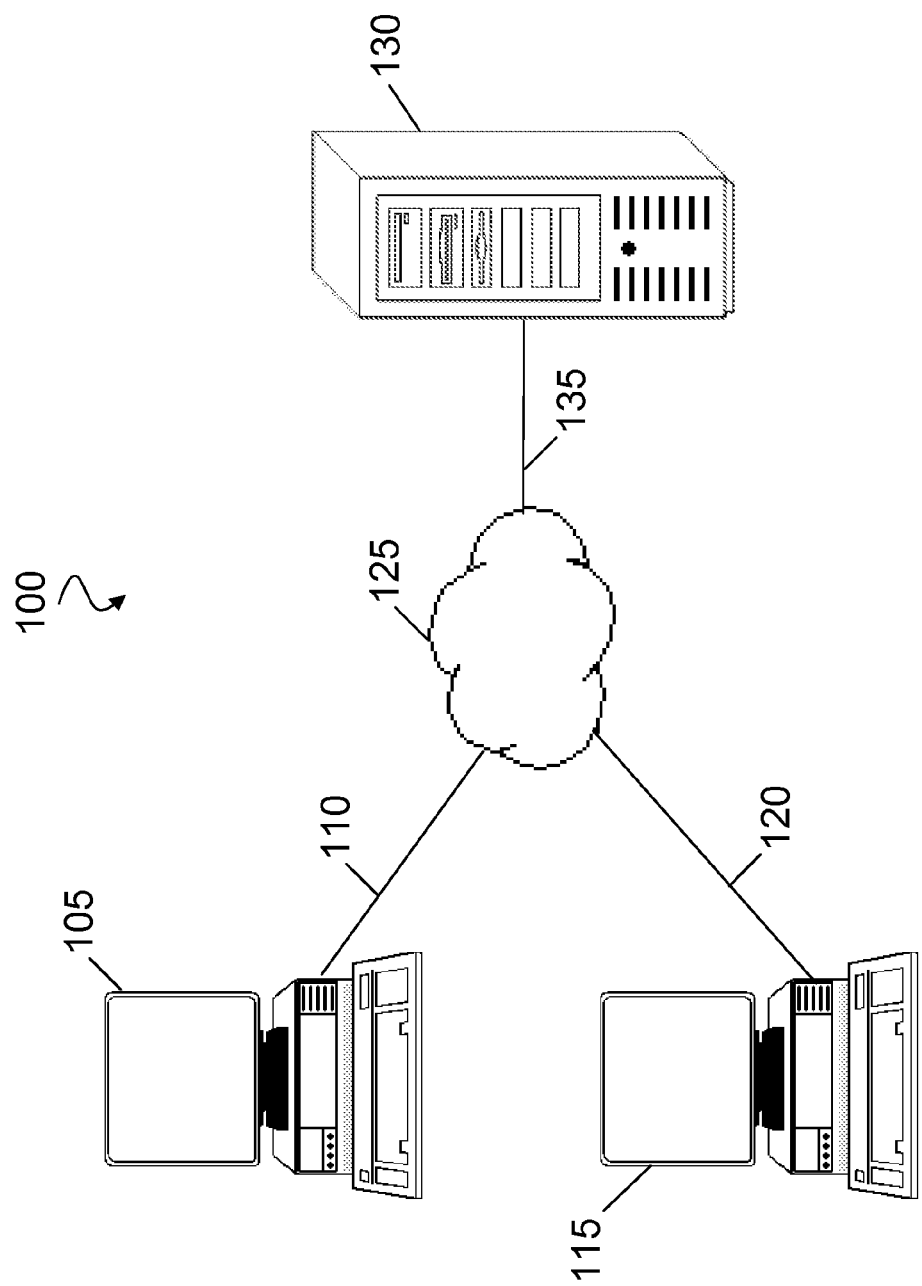
FIG. 1 presents an example of a distributed computing system for hosting a workflow management system.

FIG. 1 presents a distributed computing system 100 in which a workflow management system can be implemented. The distributed computing system 100 includes a first client computer 105 that is connected to a network 125 through a first network connection 110. The distributed computing system 100 also can include a second client computer 115 that is connected to the network 125 through a second network connection 120.

The first client computer 105 and the second client computer 115 each can be any computing device known in the art, including a personal computer (PC), a work station, a server, a laptop, a palm top, a mobile device, or other such computer. A client computer can include one or more output interfaces for presenting output to a user, including a display, a printer, and one or more speakers. A client computer also can include one or more input interfaces for receiving input, such as from a user, including a keyboard, a mouse, a touch pad, a touch screen, a joystick, a microphone, and any other such input device known in the art.

Further, the first client computer 105 and the second client computer 115 can be co-located or can be geographically separated from one another by any distance. Additionally, the first network connection 110 and the second network connection 120 each can be any wired or wireless network connection known in the art. The first network connection 110 and the second network connection 120 further can be secure or unsecure.

The network 125 can be a private network, such as a local area network, or a public network, such as the Internet. Thus, the network 125 can be comprised of one or more segments joined by one or more networking devices, including switches, hubs, and routers. A server 130 also can be connected to the network 125 through a server network connection 135. The server network connection 135 can be wired or wireless and secure or unsecure. Further, the server 130 can be any computing device configured to operate as a server for one or more applications. For example, the server 130 can be configured to host a workflow management system server application. In an implementation, the workflow management system server application can be configured to perform a variety of operations, including storing information in one or more databases, processing requests received from workflow management system client applications, and providing workflow management system functionality. The one or more databases can be included in the workflow management system server application or can be separate applications, such as any commercially available database application.

A workflow management system client application can be hosted on the first computer 105 and/or the second computer 115. The workflow management system client application can include a user interface, such as a visual and/or audio interface, that permits a user to access one or more workflow management system functions or features. In an implementation, the user interface can be presented through a web browser executed on the host computer, such as the first computer 105 or the second computer 115. Further, the workflow management system client application can be configured to communicate, directly or indirectly, with one or more other workflow management system client applications executing on other host computers connected to the network 125 and one or more workflow management system server applications executing on one or more servers connected to the network 125. The client-to-client and client-to-server communications can be performed using any protocol or combination of protocols known in the art.

Figure 2:
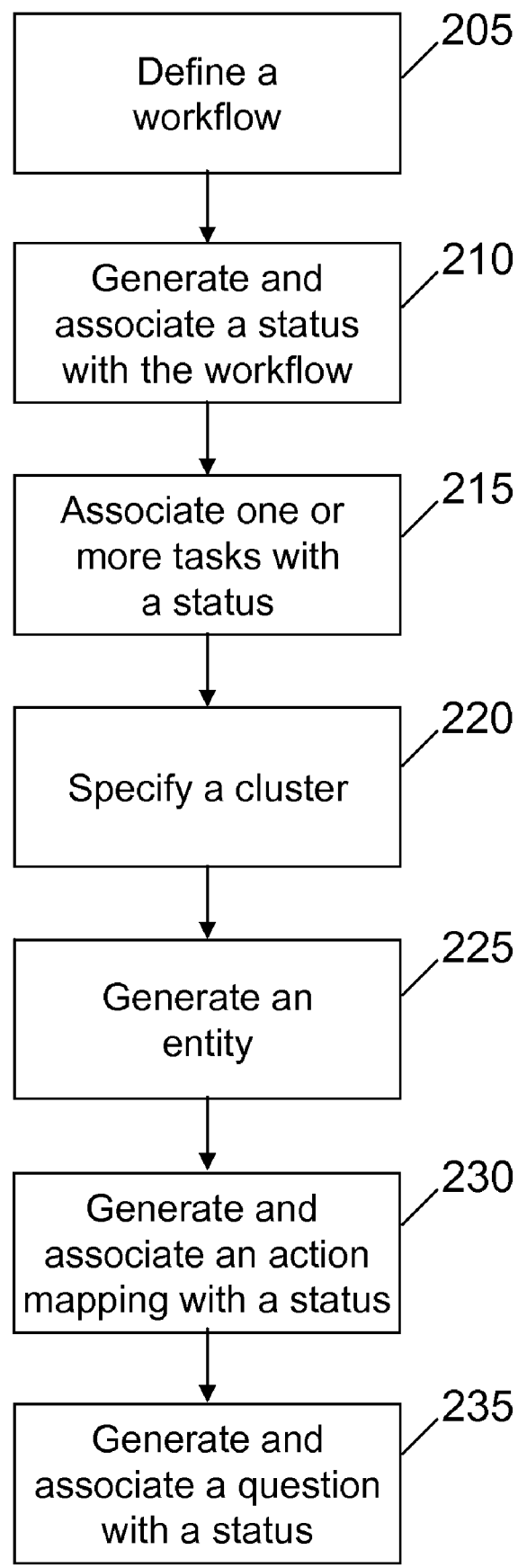
FIG. 2 presents a flowchart describing a method of generating a workflow.

FIG. 2 presents a flowchart describing a method of generating a workflow in the workflow management system. A user can define a workflow by selecting a user interface option, such as "Create a New Workflow," and specifying the name of the workflow (205). A workflow can be defined as a module comprised of one or more statuses (or steps). The one or more statuses can be generated and associated with the workflow to define the steps and the sequence of the workflow (210). A workflow can describe any process, including a process for manufacturing a widget, creating a document, or baking a cake. Further, the statuses comprising the workflow can be ordered to indicate a general progression of the workflow, although the sequence of a particular instance of the workflow can vary. A user also can modify an existing workflow such that it comprises one or more statuses in any sequence, including by adding, deleting, and reordering one or more statuses. In an implementation, the one or more statuses corresponding to a workflow can be selected from a list or menu of available statuses. Alternatively, a status can be created by the user generating the workflow, such as by specifying a status name through a status interface. In another implementation, one or more statuses can be created and associated to form a module comprising a workflow.

Further, one or more tasks can be associated with a status of the workflow to identify requirements corresponding to that status (215). A user can specify one or more tasks for each status included in the workflow, such as by selecting or entering the one or more tasks through a task interface and associating the entered tasks with a particular status. Further, the tasks associated with a particular status can be organized into a single task pane, permitting the tasks to be viewed as a collection.

A task pane can be used to indicate all of the tasks that are required to be performed to satisfy the corresponding status. Additionally, each of the task panes associated with a common workflow can be organized into a single task pane group. Collectively, the task pane group represents all of the tasks associated with the workflow. In an implementation, a task pane also can include one or more optional tasks that are not required to be performed in order to satisfy the corresponding status. For example, an optional task can serve to indicate a conditional requirement or discretionary service.

A cluster also can be specified to indicate at least one party responsible for an entity that is being processed through any portion of the workflow (220). The cluster can be comprised of any number of persons or groups, including one or more individuals, a department, an organization, a country, or any other grouping of individuals. For example, an application programming group can be specified as the cluster associated with a programming project that is entered into the workflow. If a pre-existing cluster is available, the cluster can be specified using a cluster identification. Alternatively, a new cluster can be specified by creating a cluster that includes at least one party.

Further, a cluster can be linked with a particular workflow, such that each instance of the workflow is assigned to the cluster. Additionally, a cluster can be accessed to identify each of the workflows to which that cluster is linked. In an implementation, two or more clusters can be linked with a workflow and each of the associated clusters can have responsibility for one or more statuses included in that workflow.

An entity to be operated on in accordance with the workflow also can be created (225). The entity can be tangible or intangible, including a document, a product, a project, a service, or any other thing that can be processed in accordance with a workflow. An entity identification ("ID") can be assigned to uniquely identify the entity. Further, the entity can be associated with at least one cluster and a complexity rating. The entity also can be associated with a status history table that can be used to record the progress of the entity through the workflow. For example, when the entity is initialized the status history table can include an entry identifying the first status of the workflow. When the entity has been processed through the workflow, the status history table can reflect all of the actions taken with respect to the entity throughout the workflow. Further, an entity (or application) status request can be used to determine the present state of an entity in a workflow.

In an implementation, an entity can be created through a web interface. For example, the entity can be represented by a structure in a database in which data corresponding to the entity can be recorded. Further, the entity can be defined by assigning the entity to a cluster, associating the entity with a workflow, and specifying an initial status within the workflow.

One or more action mappings further can be generated and associated with a status of the workflow (230). An action mapping specifies an action that can be performed on the entity, such as moving the entity from the current status to a different status or retaining the entity in the current status. For example, an action mapping can be used to move the entity forward in the workflow, such as to advance the entity to a new status after the current status has been completed. Similarly, an action mapping can be used to move the entity backward in the workflow, such as to send the entity back to a previous status if one or more requirements have not been properly satisfied. The action mapping can include an indicator that identifies the status to which the entity is to be transferred. Thus, the workflow management system can be configured to automatically transfer the entity to the appropriate status when a particular action mapping is invoked. By associating one or more action mappings with each status included in the workflow, the progression of an entity through the workflow can be automatically controlled.

An action mapping can be generated by specifying in an action mapping interface the type of action that is to be taken. For example, the action to be taken can be APPROVE, REJECT, or OTHER. The APPROVE action mapping advances the entity from the current status to an identified status, which represents a subsequent status in the workflow. The REJECT action mapping indicates that the entity is to remain in the current status or be sent back to a preceding status that already has been completed. Further, the REJECT action mapping can require the identification of a rework reason. For example, the user can be prompted to select a rework reason from a predefined list or to enter a rework reason. In an implementation, the rework reason specified by the user can be utilized to determine the status to which the entity is to be transferred.

The rework reason also can identify why the entity was required to repeat one or more steps, such as bad code, incorrect requirements, bad entry criteria, or failed testing. A rework table can be generated for an entity to show the rework history of that entity in a particular workflow. Further, the rework history of a plurality of iterations through a workflow also can be determined, such as to indicate improvement opportunities.

The OTHER action mapping can be used to perform any other action with respect to the entity. For example, the OTHER action mapping can be used to advance the entity to a predetermined status in the event that a particular condition arises, such as a shortened deadline. Similarly, the OTHER action mapping can be used to change the path of the entity through the workflow, such as in response to a change in requirements.

Additionally, one or more questions can be generated and associated with a status of the workflow (235). A question also can correspond to a condition that is required to be fulfilled in order to satisfy the associated status. Further, each question can be structured to include an answer type. The answer type indicates the range of acceptable responses to the question. For example, the answer type can be free text and the user can be permitted to enter any response. Alternatively, the answer type can specify use of a data entry field, such as a combo-box, to elicit a response from a predetermined set of answers, such as "yes" or "no."

With respect to a particular status, one or more questions can be generated such that the corresponding answers will indicate whether all of tasks associated with that status have been satisfactorily performed. The one or more questions associated with a status further can be mandatory, such that an action cannot be performed until all of the questions corresponding to that status have been answered.

In an implementation, one or more optional questions also can be associated with a status. An optional question can be used to collect additional information about an entity as it is processed through the workflow. An entity can, however, be transferred out of the corresponding status even if an optional question has not been answered. Further, an optional question can be distinguished from the one or more mandatory questions, such as by displaying the optional question in a different portion of the interface or by utilizing a different type of text.

In another implementation, a complexity rating can be assigned to an entity to indicate the difficulty associated with processing the entity through the workflow. The complexity rating can be based on one factor or a combination of factors, including an estimated amount of time to complete work on the entity, an estimated amount of resources to perform the workflow for that entity, and an estimated availability of resources to perform the workflow for that entity. For example, the entity can be characterized by a complexity rating of low, medium, or high. Thus, an entity with a high complexity rating might require additional resources or take longer to process through the workflow than an entity with a low complexity rating. Additionally, the complexity rating can be modified at any time to reflect a change in conditions relating to the entity, including as the entity is being processed through the workflow.

Figure 3:
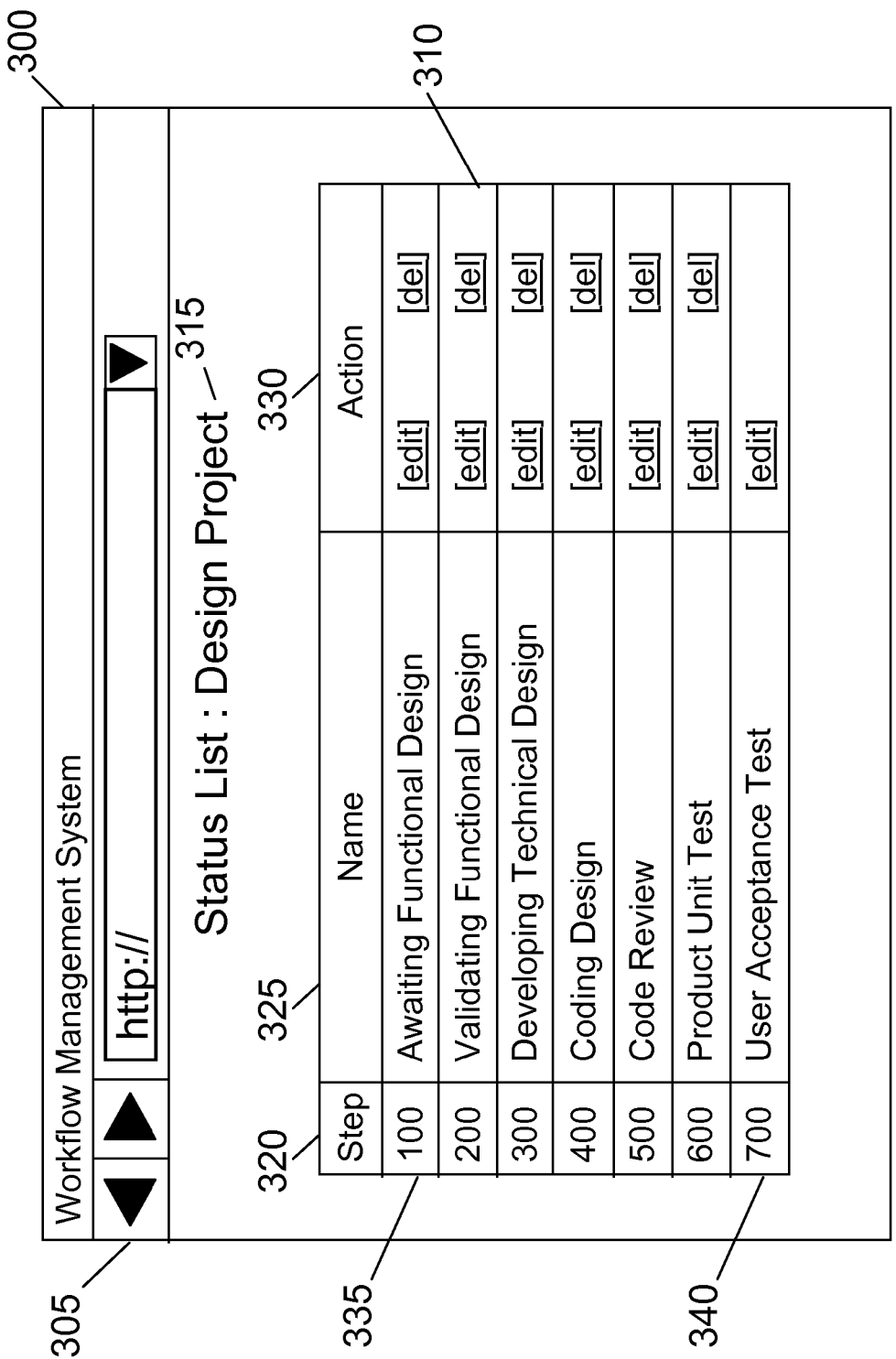
FIG. 3 depicts an example of a status list of a workflow.

FIG. 3 depicts a status list of a workflow. A status list 310 can be presented in a web browser 300 or other graphical user interface ("GUI"). The web browser 300 can include a plurality of controls 305 to permit the user to navigate within the workflow management system, including a forward button, a back button, and an address field. The web browser further can include controls such as stop, refresh, home, search, and other browser controls known in the art. For example, a user can access the status list 310 by following a link, selecting a menu option, or entering an address for the status list 310 in the address field of the controls 305. Further, a user can navigate to and from the status list 310 in the web browser 300 by selecting one or more controls, such as the forward button, back button, and/or home button.

A workflow identifier 315 also can be displayed in the web browser 300 to indicate the workflow through which the entity is being processed. The status list 310 presents each status associated with the workflow and includes a step column 320, a status name column 325, and an action column 330. The step column 320 indicates the order the status occupies in relation to the workflow. For example, the status in the first row 335 is identified as step 100, which is lowest step number in the status list 310. Therefore, the status in the first row 335 represents the first step in the workflow. Similarly, the status in the last row 340 is identified as step 700, which is the highest number in the status list 310. Therefore, the status in the last row 340 represents the last step in the workflow. In an implementation, any type of value that can be used to express an order can be used in the step column 320.

The status name column 325 presents the name of each status in the workflow. The status name can be used to generally describe the nature of the tasks associated with that status. For example, the status name "User Acceptance Test" appearing in the last row 340 indicates that the status relates to testing of the entity being processed through the workflow. Further, the action column 330 includes one or more actions that can be performed with respect to the corresponding status. For example, the actions corresponding to the status "Await Functional Design" in the first row 335 comprise edit and delete. Thus, the status can be modified or deleted from the workflow. Conversely, only the edit option is displayed corresponding to the "User Acceptance Test" status in the last row 340. The status therefore can be modified, but cannot be deleted from the workflow. Additionally, a status also can be created and added to the status list 310. One or more actions corresponding to the status can be specified when the status is created. A user can thus modify the current workflow, as permitted, through the status interface presented in the web browser 300.

Figure 4:
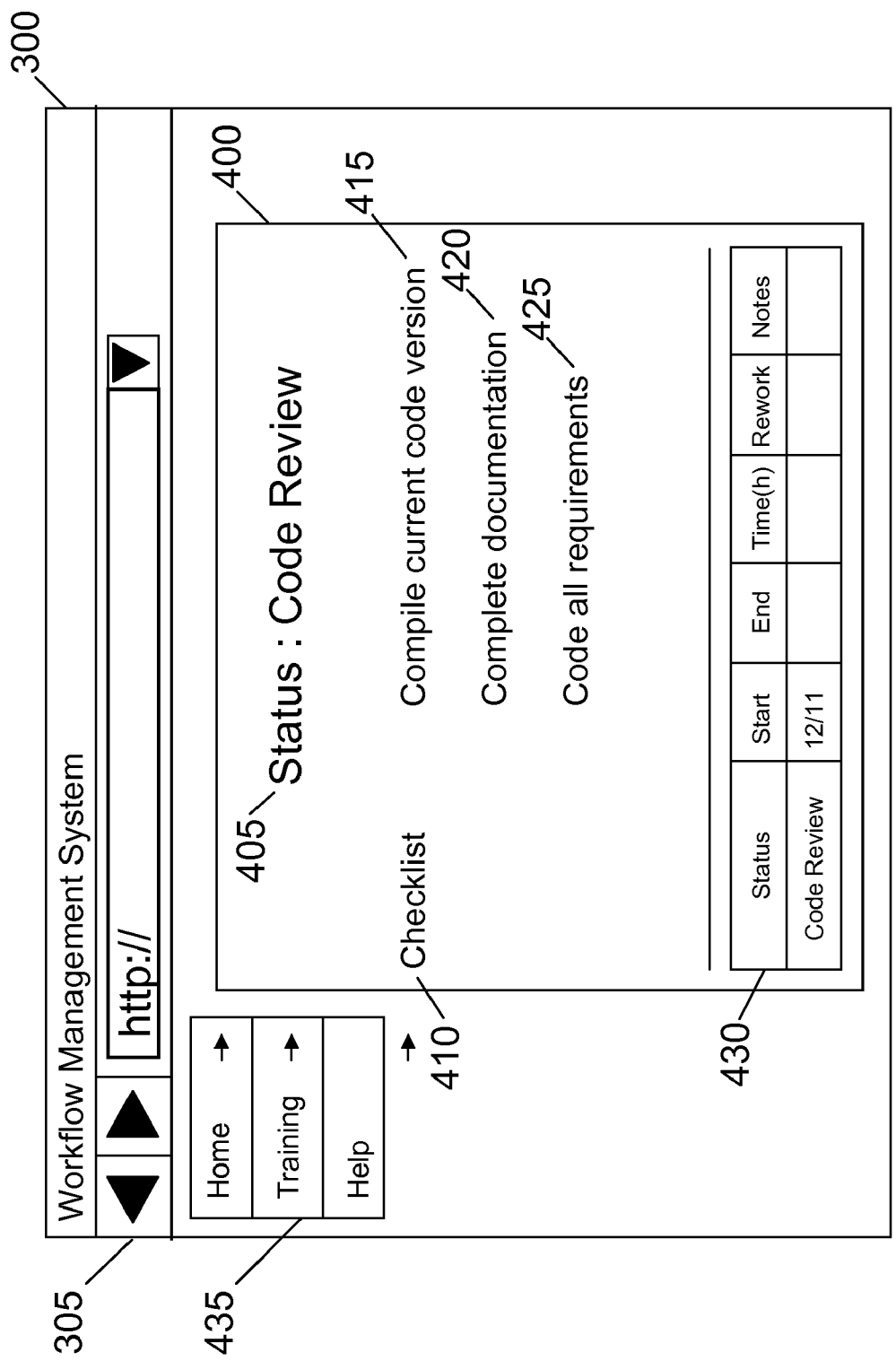
FIG. 4 depicts an example of a task pane associated with a workflow.

FIG. 4 depicts a task pane 400 associated with a workflow. The task pane 400 can be presented in the web browser 300 or other such GUI. A user also can navigate to and from the task pane 400 using one or more of the controls 305 associated with the web browser 300. The task pane 400 can be used to specify one or more tasks associated with a status, such as tasks that are required to be performed in order for the status to be completed. In an implementation, one or more tasks identified in the task pane can correspond to one or more questions presented in a query pane.

The task pane 400 can include a status identifier 405 to indicate which status the one or more tasks are associated with. For example, the status identifier "Code Review" indicates that the tasks included in the task pane 400 are associated with the step of code review included in the workflow. Further, a checklist 410 can be included in the task pane 400. The checklist 410 can be configured to include tasks that are required to be performed in order to satisfy the status. For example, the status named code review can include the mandatory tasks "compile current code version" 415, "complete documentation" 420, and "code all requirements" 425, which can be identified in the checklist 410. Thus, a user reviewing the task pane 400 can determine each of the required tasks associated with the status. Tasks can be added to or deleted from the task list as desired. Existing tasks also can be modified. Further, the tasks associated with a status can be maintained separately, such as in a database table, so that the checklist 410 can be dynamically generated.

Further, a status table 430 can be displayed in the task pane 400. The status table 430 can list the state of one or more statuses included in the workflow. For example, the status table 430 can be configured to include the current status, one or more of the completed statuses, a combination thereof, or all statuses. Each status can be listed on a separate row of the table and can be identified by a status name.

The state information presented by the status table 430 also can include the date on which the entity started the status, the date on which the entity ended the status, the amount of time the entity spent in the status, and the amount of rework performed on the entity while in that status. In an implementation, the amount of rework performed with respect to an entity can be presented separately from the time the entity spent in the status. The status table 430 also can be configured to include one or more notes relating to the status.

Additionally, the task pane 400 can include a list of links 435 that can be accessed by a user to perform one or more functions. For example, the list of links 435 can include a "home" link that can be configured to return the user to a main screen, such an overview screen for the workflow or the workflow management system. The list of links 435 also can include a "training" link to allow a user to access training materials and a "help" link to allow a user to access a help directory. Other links, such as links to other statuses of the workflow, also can be included in the list of links 435.

Figure 5:
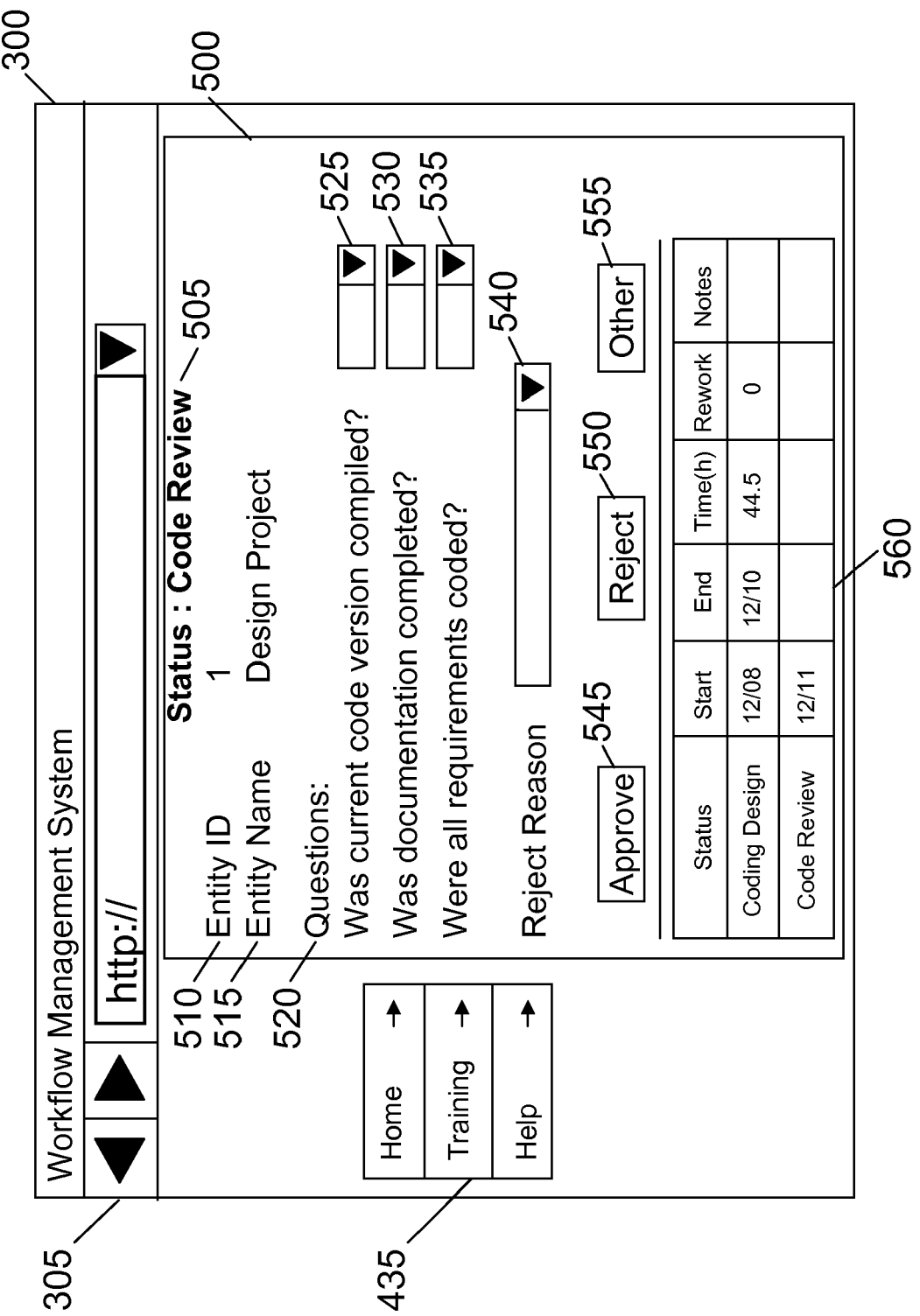
FIG. 5 depicts an example of a query pane associated with a workflow.

FIG. 5 depicts a query pane 500 associated with a workflow. The query pane 500 can be presented in the web browser 300 or other such GUI. A user also can navigate to and from the query pane 500 using one or more of the controls 305 associated with the web browser 300.

The query pane 500 can include a status identifier 505 to indicate the status with which the one or more questions are associated. For example, the status identifier "Code Review" indicates that the questions included in the query pane 500 are associated with the step of code review included in the workflow. The query pane 500 also can include an entity identifier 510 and an entity name 515 that indicate the entity with which the status is associated.

One or more questions are presented in the query pane 500 as a query list 520. Each question in the query list 520 is paired with a corresponding answer field to form a question and answer pair. The answer field can be configured as a form field with a drop-down menu, a text entry field, one or more radio buttons, or any other data entry interface known in the art. For example, the answer field can be configured as a form-field with drop-down menu including the responses "yes" and "no." Thus, a user can respond to the question only by selecting the answer "yes" or "no." In another implementation, additional or alternative responses can be presented to the user.

Further, the questions presented in the query list 520 can be configured to elicit an item of information that can be evaluated in determining whether all of the tasks that are required to be performed to satisfy the status have been satisfactorily completed. Thus, all of the information required to evaluate a status is available once all of the questions included in the query list 520 have been answered. For example, the query list 520 can include a first question and answer pair 525 asking "Was the current code version compiled?," a second question and answer pair 530 asking "Was the documentation completed?," and a third question and answer pair asking "Were all requirements coded?" Additionally, each question can be associated with a unique identifier to enable one or more actions, such as tracking the response to the question and associating the question with a checklist or task.

In an implementation, the workflow management system can be configured to automatically perform an action once all of the questions included in the query list 520 have been answered. For example, the workflow management system can be configured to approve transferring the entity to the next status if the status was satisfactorily completed. Alternatively, the workflow management system can be configured to reject the entity if the status was not satisfactorily completed. If the workflow management system determines not to advance an entity (rejects the entity), the system can further determine whether to keep the entity in the current status or to transfer the entity to a different status.

The workflow management system further can be configured to automatically detect that each of the questions in the query list 520 have been answered. For example, the system can determine that a response has been entered into the answer field corresponding to each question in the query list 520. Alternatively, the workflow management system can be configured to accept the user's responses once they are submitted, such as through a user initiated action. Additionally, the workflow management system can be configured to prompt the user to enter a response if an answer has not been received for one or more questions. In an implementation, the workflow management system can be configured to reject the entity once it is determined that at least one required task has not been satisfactorily performed.

If the responses to the one or more questions in the query list 520 indicate that all of the tasks required to be performed to satisfy the status have not been satisfactorily completed, the user can be prompted to select a reason for rejection from a reject reason field 540. The reject reason field 540 can be configured as a form field with a drop-down menu, a text entry field, one or more radio buttons, or any other data entry interface known in the art. In an implementation, the reject reason field 540 can be inactive until it is determined that at least one required task associated with the status has not been satisfactorily completed. Further, one or more reject reasons associated with the reject reason field 540 can be provided by a user, such as through a separate configuration screen. Additionally, one or more standard reject reasons can be supplied by the system.

The query pane 500 also can include one or more action buttons that can be manually selected by the user. Each action button can be associated with an action mapping to be performed on the entity being processed through the workflow. For example, an approve button 545 can be configured to approve the entity for transfer to a subsequent status identified by the corresponding action mapping. Further, a reject button 550 can be configured to retain the entity in the current status or to transfer the entity back to a previous status, based on the corresponding action mapping.

Additionally, an other button 555 can be configured to execute an action other than approving or rejecting the entity. For example, the other button 555 can be used to change the path of the entity through the workflow or to advance the entity to a non-sequential subsequent status. In an implementation, a submit button also can be included to permit the user to submit the entered responses to the workflow management system. Further, the responses also can be automatically submitted to the workflow management system as they are entered, after the expiration of a predetermined time period, or if the user leaves the query pane 500.

The query pane 500 also can be configured to include a status table 560 that presents the state of one or more statuses. For example, the status table 560 can be configured to include a current status, such as "Code Review," and a previous status, such as "Coding Design." Each status can be listed on a separate row of the status table 560. In another implementation, the status table 560 can include any number of statuses.

The state information presented by the status table 560 also can include, for each status, the date on which the entity started the status, the date on which the entity ended the status, the amount of time the entity spent in the status, and the amount of rework performed on the entity while in that status. In an implementation, the amount of rework performed with respect to an entity can be presented separately from the time the entity spent in the status. The status table 560 also can be configured to include one or more notes relating to the status.

Figure 6:
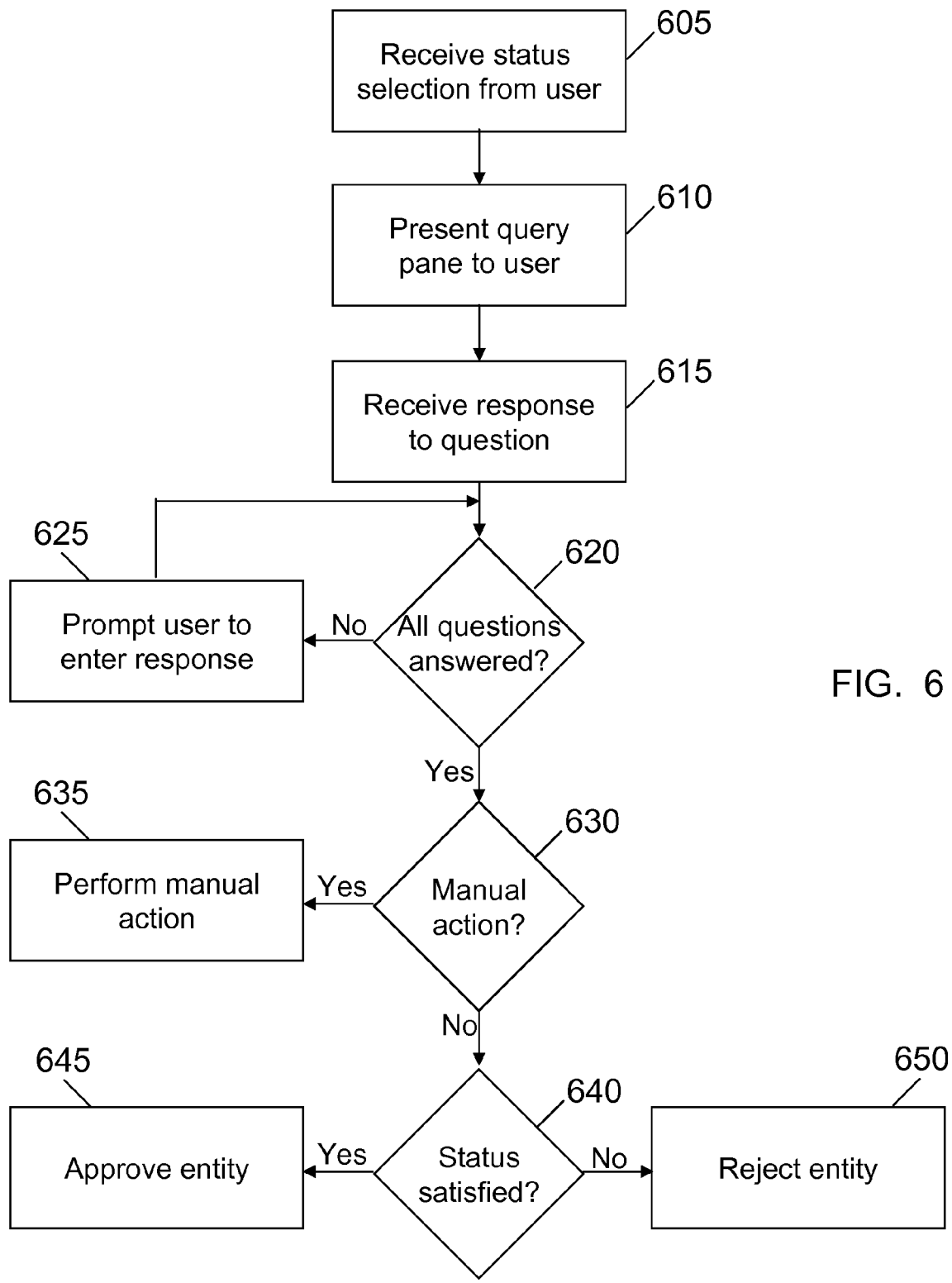
FIG. 6 presents a flowchart describing a method of evaluating a status.

FIG. 6 presents a flowchart describing a method of evaluating a status. A user can select a status to evaluate, such as by entering a selection through a user interface (605). A query pane corresponding to the selected status then can be presented to the user (610). As described above, the query pane can be presented to the user in a web browser or other such GUI. Also as described above, the query pane can include a query list that includes one or more questions associated with the selected status. Further, the questions can be structured to obtain the information needed to determine whether all of the tasks that are required to be performed to satisfy the status have been satisfactorily completed.

The user's responses to the one or more questions included in the query pane are received by the system (615). For example, a response can be received when the response is entered by the user. Alternatively, a response can be received after the user has performed an action to submit the response, such as selecting a button or answering a subsequent question. Additionally, a response can be received once a predetermined period of time passes after the response was entered.

Upon receiving a response from the user, it can be determined whether each of the questions included in the query list have been answered (620). If a response has not been received for one or more of the questions in the query list, the user can be prompted to answer the remaining one or more questions (625). In an implementation, the system can be configured to determine whether any of the received responses indicate that a task associated with the status was not satisfied. If it is determined that the status was not satisfied, the entity can be rejected instead of prompting the user to answer one or more of the remaining questions.

Once a response has been received for each question in the query list, it can be determined whether a manual action has been received from the user (630). If the user has specified a manual action, the action indicated by the user can be performed (635). For example, the action mapping associated with a button selected by the user can be executed.

In an implementation, one or more manual actions can be prohibited based on the responses received from the users. For example, an approve button included in the interface can be disabled if the received responses indicate that at least one required task was not satisfactorily completed. Thus, a user cannot approve an entity that has not satisfied the current status. Similarly, all buttons can be disabled if a response has not been received for at least one mandatory question. Thus, a user can be required to answer all mandatory questions before any actions can be taken with respect to an entity. Further, one or more actions also can be disabled if the user does not have authorization to perform an action with respect to the current status. A visual indicator can be used to indicate that one or more manual actions are prohibited, such as by shading a disabled button and an active button differently.

If the user has submitted the one or more responses or has not specified a manual action, it can be automatically determined whether all of the tasks that are required to be performed to satisfy the status have been satisfactorily completed (640). If all of the required tasks have been satisfactorily completed, the entity is approved (645). Approving the entity can invoke the action mapping associated with approval. Otherwise, the entity is rejected (650). Rejecting the entity can invoke the action mapping associated with rejection.

Figure 7:
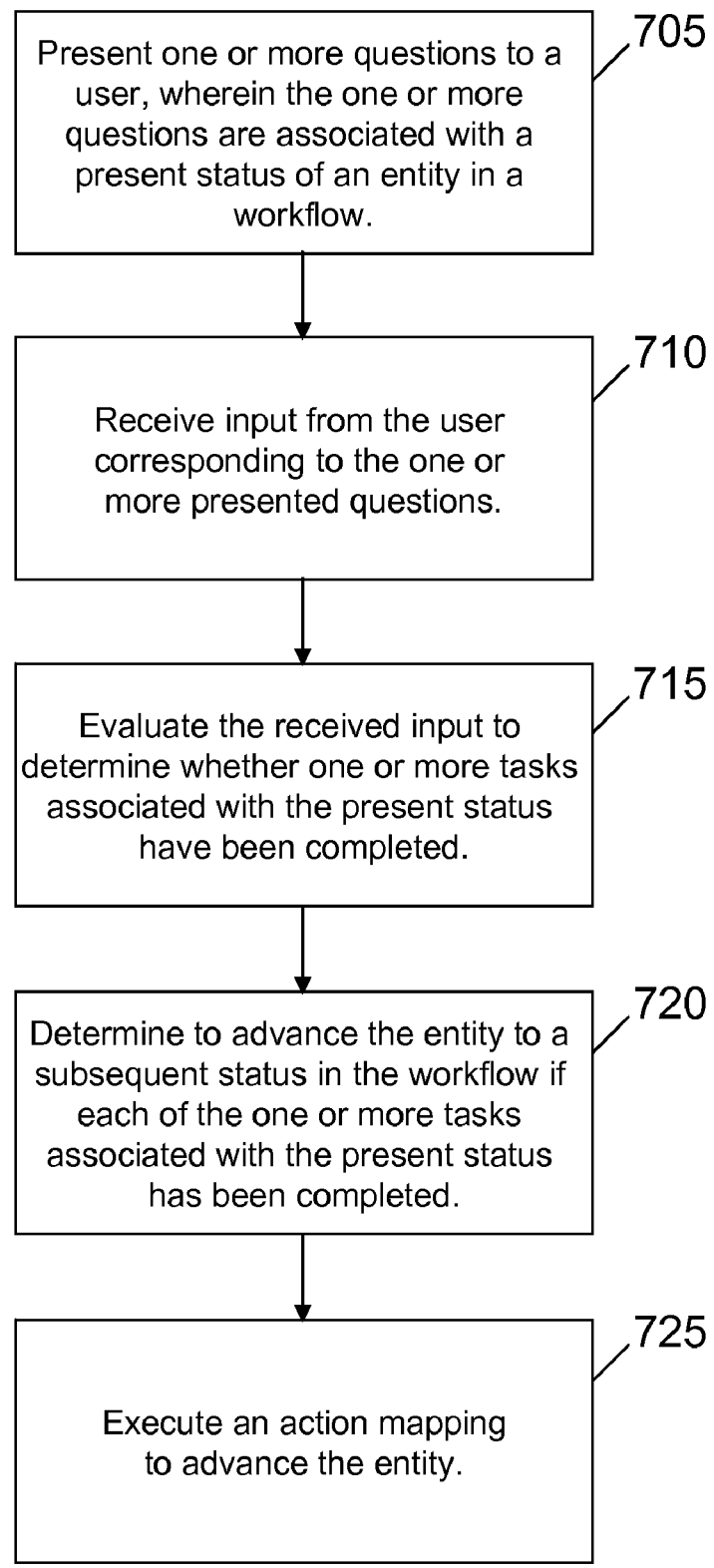
FIG. 7 presents a flowchart for a method of managing a workflow.

FIG. 7 describes a computer-implemented method of managing a workflow. In a first step 705, one or more questions are presented to a user, wherein the one or more questions are associated with a present status of an entity being processed through a workflow. In a second step 710, input is received from the user corresponding to the one or more presented questions. In a third step 715, the received input is evaluated to determine whether one or more tasks associated with the present status have been completed. In a fourth step 720, it is determined that the entity is to be advanced to a subsequent status in the workflow if each of the one or more tasks associated with the present status has been completed. In a fifth step 725, an action mapping is executed to advance the entity.

A number of implementations have been disclosed herein. Nevertheless, it will be understood that various modifications may be made without departing from the spirit and scope of the claims. Accordingly, other implementations are within the scope of the following claims.

What is claimed is:

1. A computer-implemented method of managing a workflow, the method comprising:

identifying action mappings associated with a present status of an entity being processed through a workflow, the action mappings including an APPROVE action mapping for advancing the entity from the present status to a subsequent status in the workflow, a REWORK action mapping for holding the entity in the present status or sending the entity back to a preceding status in the workflow, and an OTHER action mapping for advancing the entity to a predetermined status based upon a particular condition being fulfilled;

presenting questions associated with the present status to a user through a user interface, the questions including one or more mandatory questions which elicit information for evaluation in determining whether one or more tasks that are required to be performed to satisfy the present status have been satisfactorily completed, and one or more optional questions which elicit additional information about the entity as it is processed through the workflow;

evaluating a user input to determine that all of the mandatory questions have been answered, and that the user has answered one or more of the optional questions or has provided a rework reason;

when all of the mandatory questions have been answered, automatically evaluating the user input to determine that corresponding answers to the one or more mandatory questions indicate that the one or more tasks associated with the present status have been satisfactorily completed, and enabling an APPROVE control associated with the APPROVE action mapping on the user interface;

when the user has answered all of the mandatory questions and one or more of the optional questions, automatically evaluating the received input to determine that corresponding answers to the one or more optional questions indicate that the particular condition is fulfilled, and enabling an OTHER control associated with the OTHER action mapping on the user interface;

when the user has answered all of the mandatory questions and has provided the rework reason, identifying the preceding status from among multiple preceding statuses based on the rework reason, and enabling a REWORK control associated with the REWORK action mapping on the user interface;

receiving a user selection of one of the enabled controls; and executing the action mapping associated with the selected control.

2. The method of claim 1, wherein one or more of the questions is associated with a free text data entry field into which the user may enter free text as an answer.

3. The method of claim 1, wherein the user interface further comprises:
a workflow identifier identifying the workflow, and
a status table presenting a name of current and completed statuses within the workflow, a date when the current and completed statuses staffed, and a date when the completed statuses finished.

4. The method of claim 1, wherein executing the action further comprises approving a transfer of an entity being processed by the workflow.

5. The method of claim 1, wherein the predetermined status associated with the OTHER action mapping is a non-sequential, subsequent status.

6. The method of claim 1, further comprising:
evaluating the user input to determine, before all of the mandatory questions have been answered, that corresponding answers to the answered mandatory questions indicate that the one or more tasks associated with the present status have not been satisfactorily completed; and
enabling only the REWORK control based on determining that the corresponding answers to the answered mandatory questions indicate that the one or more tasks associated with the present status have not been satisfactorily completed.

7. The method of claim 1, further comprising, when the user has answered all of the mandatory questions and has provided the rework reason, determining an amount of rework associated with the REWORK action mapping.

8. A system for managing a workflow, the system comprising:
one or more computers; and
a computer-readable medium coupled to the one or more computers having instructions stored thereon which, when executed by the one or more computers, cause the one or more computers to perform operations comprising:
identifying action mappings associated with a present status of an entity being processed through a workflow, the action mappings including an APPROVE action mapping for advancing the entity from the present status to a subsequent status in the workflow, a REWORK action mapping for holding the entity in the present status or sending the entity back to a preceding status in the workflow, and an OTHER action mapping for advancing the entity to a predetermined status based upon a particular condition being fulfilled;
presenting questions associated with the present status to a user through a user interface, the questions including one or more mandatory questions which elicit information for evaluation in determining whether one or more tasks that are required to be performed to satisfy the present status have been satisfactorily completed, and one or more optional questions which elicit additional information about the entity as it is processed through the workflow;
evaluating a user input to determine that all of the mandatory questions have been answered, and that the user has answered one or more of the optional questions or has provided a rework reason;
when all of the mandatory questions have been answered, automatically evaluating the user input to determine that corresponding answers to the one or more mandatory questions indicate that the one or more tasks associated with the present status have been satisfactorily completed, and enabling an APPROVE control associated with the APPROVE action mapping on the user interface;
when the user has answered all of the mandatory questions and one or more of the optional questions, automatically evaluating the received input to determine that corresponding answers to the one or more optional questions indicate that the particular condition is fulfilled, and enabling an OTHER control associated with the OTHER action mapping on the user interface;
when the user has answered all of the mandatory questions and has provided the rework reason, identifying the preceding status from among multiple preceding statuses based on the rework reason, and enabling a REWORK control associated with the REWORK action mapping on the user interface;
receiving a user selection of one of the enabled controls; and
executing the action mapping associated with the selected control.

9. The system of claim 8, wherein one or more of the questions is associated with a free text data entry field into which the user may enter free text as an answer.

10. The system of claim 8, wherein the user interface further comprises:
a workflow identifier identifying the workflow, and
a status table presenting a name of current and completed statuses within the workflow, a date when the current and completed statuses started, and a date when the completed statuses finished.

11. The system of claim 8, wherein executing the action further comprises approving a transfer of an entity being processed by the workflow.

12. The system of claim 8, wherein the predetermined status associated with the OTHER action mapping is a non-sequential, subsequent status.

13. The system of claim 8, wherein the operations further comprise:

evaluating the user input to determine, before all of the mandatory questions have been answered, that corresponding answers to the answered mandatory questions indicate that the one or more tasks associated with the present status have not been satisfactorily completed; and enabling only the REWORK control based on determining that the corresponding answers to the answered mandatory questions indicate that the one or more tasks associated with the present status have not been satisfactorily completed.

14. The system of claim 8, further comprising, when the user has answered all of the mandatory questions and has provided the rework reason, determining an amount of rework associated with the REWORK action mapping.

15. A computer storage medium encoded with a computer program for managing a workflow, the program comprising instructions that when executed by data processing apparatus cause the data processing apparatus to perform operations comprising:

identifying action mappings associated with a present status of an entity being processed through a workflow, the action mappings including an APPROVE action mapping for advancing the entity from the present status to a subsequent status in the workflow, a REWORK action mapping for holding the entity in the present status or sending the entity back to a preceding status in the workflow, and an OTHER action mapping for advancing the entity to a predetermined status based upon a particular condition being fulfilled;

presenting questions associated with the present status to a user through a user interface, the questions including one or more mandatory questions which elicit information for evaluation in determining whether one or more tasks that are required to be performed to satisfy the present status have been satisfactorily completed, and one or more optional questions which elicit additional information about the entity as it is processed through the workflow;

evaluating a user input to determine that all of the mandatory questions have been answered, and that the user has answered one or more of the optional questions or has provided a rework reason;

when all of the mandatory questions have been answered, automatically evaluating the user input to determine that corresponding answers to the one or more mandatory questions indicate that the one or more tasks associated with the present status have been satisfactorily completed, and enabling an APPROVE control associated with the APPROVE action mapping on the user interface;

when the user has answered all of the mandatory questions and one or more of the optional questions, automatically evaluating the received input to determine that corresponding answers to the one or more optional questions indicate that the particular condition is fulfilled, and enabling an OTHER control associated with the OTHER action mapping on the user interface;

when the user has answered all of the mandatory questions and has provided the rework reason, identifying the preceding status from among multiple preceding statuses based on the rework reason, and enabling a REWORK control associated with the REWORK action mapping on the user interface;

receiving a user selection of one of the enabled controls; and executing the action mapping associated with the selected control.

16. The computer storage medium of claim 15, wherein one or more of the questions is associated with a free text data entry field into which the user may enter free text as an answer.

17. The computer storage medium of claim 15, wherein the user interface further comprises:

a workflow identifier identifying the workflow, and a status table presenting a name of current and completed statuses within the workflow, a date when the current and completed statuses started, and a date when the completed statuses finished.

18. The computer storage medium of claim 15, wherein executing the action further comprises approving a transfer of an entity being processed by the workflow.

19. The computer storage medium of claim 15, wherein the predetermined status associated with the OTHER action mapping is a non-sequential, subsequent status.

20. The computer storage medium of claim 15, wherein the operations further comprise:

evaluating the user input to determine, before all of the mandatory questions have been answered, that corresponding answers to the answered mandatory questions indicate that the one or more tasks associated with the present status have not been satisfactorily completed; and enabling only the REWORK control based on determining that the corresponding answers to the answered mandatory questions indicate that the one or more tasks associated with the present status have not been satisfactorily completed.

* * * * *

UNITED STATES PATENT AND TRADEMARK OFFICE
CERTIFICATE OF CORRECTION

PATENT NO. : 7,617,245 B2 Page 1 of 1
APPLICATION NO. : 11/679097
DATED : November 10, 2009
INVENTOR(S) : Andre Guerreiro Milhomem De Souza It is certified that error appears in the above-identified patent and that said Letters Patent is hereby corrected as shown below:

In column 13, line 38, in claim 3, delete "staffed," and insert --started,--, therefor.

Signed and Sealed this

Twenty-fifth Day of May, 2010

David J. Kappos
*Director of the United States Patent and Trademark Office*